(12) United States Patent
Mantovani

(10) Patent No.: US 12,466,246 B2
(45) Date of Patent: *Nov. 11, 2025

(54) RETRACTABLE TONNEAU COVER FOR TRUCK BED VEHICLES AND SIMILAR

(71) Applicant: KEKO ACESSÓRIOS S/A, Caxias do Sul (BR)

(72) Inventor: Juliano Scheer Mantovani, Caxias do Sul (BR)

(73) Assignee: KEKO ACESSÓRIOS S/A, Caxias do Sul (BR)

( * ) Notice: Subject to any disclaimer, the term of this patent is extended or adjusted under 35 U.S.C. 154(b) by 368 days.

This patent is subject to a terminal disclaimer.

(21) Appl. No.: 18/019,062

(22) PCT Filed: Jun. 28, 2021

(86) PCT No.: PCT/BR2021/050285
§ 371 (c)(1),
(2) Date: Jan. 31, 2023

(87) PCT Pub. No.: WO2023/272364
PCT Pub. Date: Jan. 5, 2023

(65) Prior Publication Data
US 2023/0286361 A1    Sep. 14, 2023

(51) Int. Cl.
*B60J 7/06*    (2006.01)
*B60P 7/02*    (2006.01)

(52) U.S. Cl.
CPC ............... *B60J 7/068* (2013.01); *B60P 7/02* (2013.01)

(58) Field of Classification Search
CPC ..... B60J 7/06; B60J 7/061; B60J 7/062; B60J 7/067; B60J 7/068
USPC ............. 296/100.11, 100.12, 100.17, 100.18
See application file for complete search history.

(56) References Cited

U.S. PATENT DOCUMENTS

| | | | |
|---|---|---|---|
| 4,786,099 A * | 11/1988 | Mount | B60J 7/068 296/100.09 |
| 4,889,381 A | 12/1989 | Tamblyn et al. | |
| 5,988,728 A | 11/1999 | Lund et al. | |
| 6,113,176 A | 9/2000 | Bernardo | |

(Continued)

FOREIGN PATENT DOCUMENTS

| | | |
|---|---|---|
| BR | 202015017622 U2 | 4/2016 |
| BR | 202017024571 U2 | 6/2018 |

(Continued)

*Primary Examiner* — Dennis H Pedder
(74) *Attorney, Agent, or Firm* — Piloff Passino & Cosenza LLP; Rachel K. Piloff; Sean A. Passino

(57) ABSTRACT

The retractable tonneau cover for truck bed vehicles and similar, object of the present invention, comprises a mechanism box (100) provided with a winding stress shaft (10), and in the electric model, a drive axle (20) driven by an electric motor that enable the movement of opening and closing a retractable tonneau cover mat. The mechanism box is provided with an embodiment that improves the drainage system in order to prevent the accumulation of water inside it. In addition to the electrical model, the box (100) has a relief on its face that receives the control module with access from the outer portion, which improves accessibility and avoids the need to open the entire set, in case it needs maintenance, further having a management and activation system via Bluetooth and radio frequency.

13 Claims, 37 Drawing Sheets

(56) References Cited

U.S. PATENT DOCUMENTS

| | | |
|---|---|---|
| 9,399,391 B2 | 7/2016 | Bernardo et al. |
| 11,046,157 B2 * | 6/2021 | Rørvig .................... B60J 7/068 |
| 11,267,321 B2 * | 3/2022 | Jocz ........................ B60J 7/068 |
| 12,083,875 B2 * | 9/2024 | Pattabhiraman ...... B60R 16/033 |
| 2015/0210321 A1 | 7/2015 | Jutila et al. |
| 2016/0031305 A1 | 2/2016 | Bernardo et al. |
| 2016/0236551 A1 | 8/2016 | Hannan et al. |
| 2018/0043759 A1 | 2/2018 | Rohr et al. |
| 2020/0101823 A1 | 4/2020 | Bernardo |
| 2020/0171928 A1 | 6/2020 | Rawnsley et al. |

FOREIGN PATENT DOCUMENTS

| | | |
|---|---|---|
| BR | 102018074023 A2 | 2/2019 |
| WO | 2005044620 A2 | 5/2005 |
| WO | 2020076666 A1 | 4/2020 |

* cited by examiner

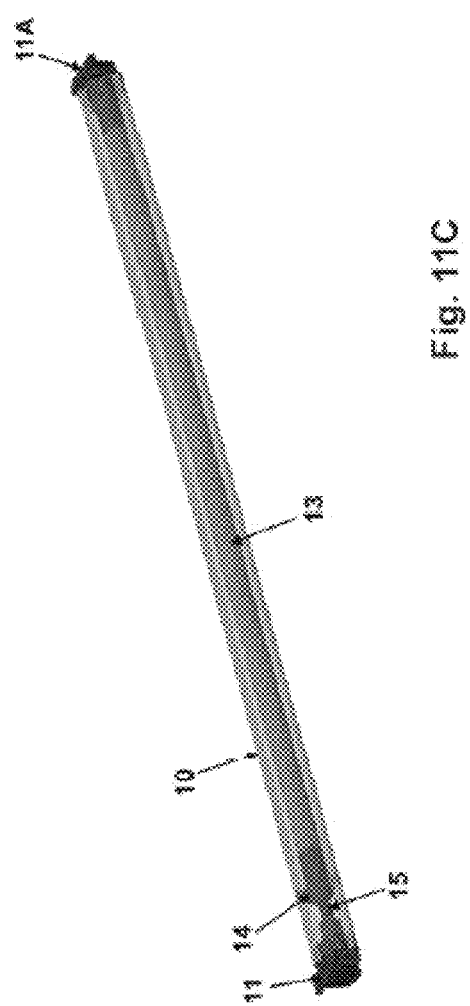

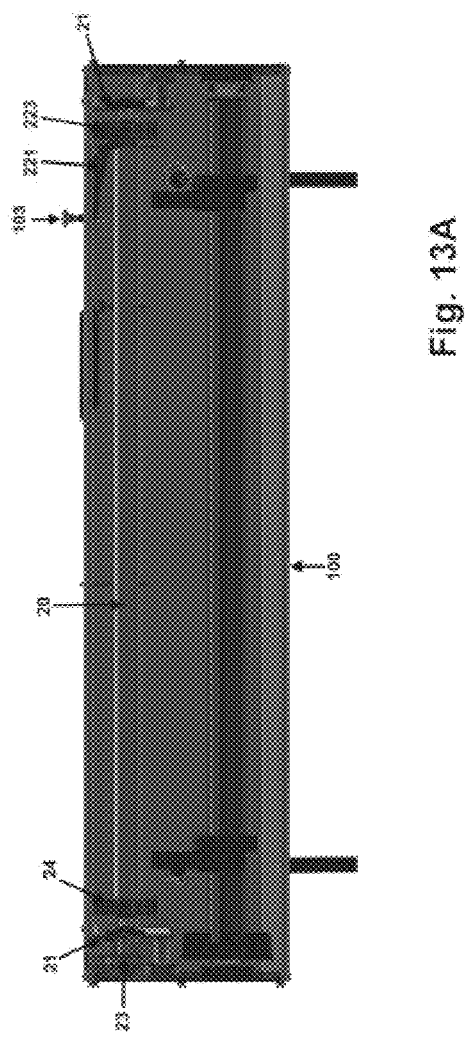

RETRACTABLE TONNEAU COVER FOR TRUCK BED VEHICLES AND SIMILAR

FIELD OF THE INVENTION

The present invention describes a hard retractable tonneau cover for truck bed vehicles and similar. More specifically, it comprises a mechanism box equipped with a winding stress shaft, and in the electric model, an axle drive driven by an electric motor that enables the movement of opening and closing the cover. The stress shaft is responsible for collecting the mat and keeping it wound on the shaft. The embodiment of the stress shaft ensures greater ease of maintenance due to the fitting and removal occurring through the upper portion, avoiding uninstalling the product and assuring greater efficiency in the mat winding and stress system. On the other hand, the axle drive, present in the automatic version, is equipped with an embodiment that promotes the automatic movement of the mat set and ensures greater practicality in activating, also having a clutch that can be activated in the event of a malfunction of the electrical system.

The mechanism box is equipped with an embodiment that improves the drainage system in order to prevent the accumulation of water inside it, in addition to the electrical model, the box has a relief on its face that receives the control module with access from the outer portion, which improves accessibility and avoids the need to open the entire set in case it needs maintenance.

The system management module is completely sealed with a perfect water and dust seal, which ensures greater durability of the electronic system. The module has an embodiment that features a set of buttons for manual activation by the user and system setting, in addition to having a management and activation system via Bluetooth and RF (radio frequency) that allows equipment control by application (app), it also has integrated lighting that when activated can illuminate the entire interior of the bed.

This new embodiment applied in retractable tonneau cover for pickup trucks in general aims to protect the inner portion of the bed through a system that is easy to install, maintain and ensure greater efficiency in operation and use, ensuring greater strength, security and convenience to users.

BACKGROUND OF THE INVENTION

Light cargo vehicles, similar to a pickup truck, with a driver cabin and open bed (pick-up trucks) are suitable for receiving the cover, which may or may not fall back, completely covering the bed.

The tonneau cover consisted of a set of profiles generally forming a rectangle, which will be attached to the vehicle's bed in order to allow the cover to be fixed, so that normally these covers are made of tarpaulin wherein the opening and closing can be done manually or automatically.

In addition, there are hard cap covers on the market made of fiber, steel or plastic and equipped with one or two hard caps positioned on the bed, opening and closing can be done manually or automatically.

However, there are several inconveniences in using these covers, especially in tarpaulin covers, because the protection is performed by a tarpaulin that can be easily torn, in addition to allowing the accumulation of water, which generates a greater probability of leaking into the interior of the bed. Another important factor is the difficulty that some users find in the manual opening and closing system, discouraging the use of the bed.

The cap-type covers, on the other hand, despite providing greater security as they do not use tarpaulin for closing, have a structure that limits the access of large volumes to the inside of the bed, generating several inconveniences for users due to the need to disengage the covers to allow full use of the bed.

Thus, the present inventor, seeking to solve the inconveniences of the market, has developed a hard retractable tonneau cover system with automatic activation that features a compact embodiment allowing for greater ease in installation and maintenance, in addition to having greater efficiency of the hard tarpaulin automatic winding system.

In research performed in the prior art, we identified several documents describing tonneau covers with automatic opening and closing systems, which we can highlight the following documents:

WO2005044620 (De Almeida, Carlos. 2003) describes an automatic remote control for opening and closing of system for pickup truck beds that features rails fixed to the bed that receive a set of sleepers, called sleepers that are attached to a cable made of steel that is activated by a motor-reducer and a set of pulleys, thus allowing the displacement of the sleepers and, consequently, the displacement of the protective cover that is fixed to the sleepers, allowing automatic movement of the cover through the activation of remote control or button inside the vehicle.

This document cited in the prior art shows a complex embodiment provided with several components and a mechanism box that is difficult to install and maintain.

US2015210321 (GM Global. 2014) describes a system for opening and closing covers for beds wherein the cover is placed on the inner portion of the tailgate, so that the tarpaulin is rolled up with a coil that allows the cover to be retracted on the vehicle bed.

This document cited in the prior art shows an embodiment in which the tarpaulin is embedded with the tailgate in order to describe its own embodiment that differs from the present design.

US2016236551 (Bos Automotive. 2015) describes an opening and closing cover system for bed that features a tarpaulin driven by a system equipped with a main roller, motors and steel cable that allow the opening and closing movement of the cover in a manner automated.

This document cited in the prior art shows a complex embodiment provided with several components and a mechanism box that is difficult to install and maintain, and this embodiment completely differs from the project claimed by the present inventor.

U.S. Pat. No. 6,113,176 (Roll-N-Lock. 1998) describes slats having a leading edge with a curved segment of a predefined radius of curvature on its inner surface and its outer surface, said slat edge having a curved segment of a radius of predetermined curvature on its inner surface and its outer surface and a flat flange segment at the end of the inclined curved segment to engage the lower surface of an adjacent blade at an angle of approximately 45 degrees relative to the adjacent structure.

U.S. Pat. No. 9,399,391 (Roll-N-Lock. 2014) describes a plurality of profiles provided at its ends with rectangular projections having an opening point, allowing the arrangement of a structure that guarantees angular movement. Covers that allow fastening between the slats being arranged at the ends.

U.S. Pat. Nos. 6,113,176 and 9,399,391 cited in the prior art show an embodiment provided with several components, and this constructive form completely differs from the project claimed by the present inventor, as it does not describe the same embodiment characteristics of the mechanism box and its components.

BR202015017622-3, by the same Applicant, describes an equipment to close the beds of utility vehicles, which belongs to the field of vehicle accessories; comprised of a mat consisting of multiple rigid profiles positioned laterally and joined by an "H" profile, which run along rigid rails positioned on the lateral edge of the bed, said mat being coupled to gears, which are driven by an electric motor.

This document cited in the prior art describes embodiment characteristics applied to the hard cover drive system. Thus, the present inventor made embodiment modifications to the equipment in order to improve the subject matter claimed in the present patent.

Thus, the object of the present invention is a retractable tonneau cover for truck bed vehicles and similar. More specifically, it comprises a mechanism box equipped with a winding stress shaft, and in the electric model, an axle drive driven by an electric motor that enables the movement of opening and closing the cover. The stress shaft is responsible for collecting the mat and keeping it wound on the shaft. The embodiment of the stress shaft ensures greater ease of maintenance due to the fitting and removal occurring through the upper portion, avoiding uninstalling the product and assuring greater efficiency in the mat winding and tensioning system. On the other hand, the axle drive, present in the automatic version, is equipped with an embodiment that promotes the automatic movement of the mat set and ensures greater practicality in activating, also having a clutch that can be activated in the event of a malfunction in the electrical system.

The mechanism box is equipped with an embodiment that improves the drainage system in order to prevent the accumulation of water inside it, in addition to the electrical model, the box has a relief on its face that receives the control module with access from the outer portion, which improves accessibility and avoids the need to open the entire set in case it needs maintenance.

The system management module is completely sealed with a perfect water and dust seal, which ensures greater durability of the electronic system. The module is constructively endowed with a set of buttons for manual activation by the user and system setting, in addition to a management and activation system via Bluetooth and RF (radio frequency) that allows control of the equipment by application (app), it also has integrated lighting that when activated can illuminate the entire interior of the bed.

This new embodiment applied in retractable tonneau cover for pickup trucks in general aims to protect the inside of the bed through a system that is easy to install, maintain and ensure greater efficiency in operation and use, ensuring greater strength, security and convenience to users.

SUMMARY OF THE INVENTION

It is characteristic of the present invention a retractable tonneau cover for truck bed vehicles and similar that provides a mechanism box equipped on the inner portion with a stress shaft consisting of a profile provided with a cylindrical geometry with protrusions longitudinally arranged in order to allow fixation of rollers through the grooves that fit together with the 3 protrusions of the shaft.

It is characteristic of the present invention a retractable tonneau cover for truck bed vehicles and similar that provides an shaft describing tips that fit with the box supports.

It is characteristic of the present invention a retractable tonneau cover for truck bed vehicles and similar that provides a profile having a helical spring threadedly attached to the tip in its inner portion.

It is characteristic of the present invention a retractable tonneau cover for truck bed vehicles and similar that provides a cylindrical rod responsible for supporting the spring inside the profile of the stress shaft.

It is characteristic of the present invention a retractable tonneau cover for truck bed vehicles and the like that provides a torpedo that is equipped with projections allowing the fixation together with the protrusions of the drive axle profile, in order to allow the rotational locking of the spring but still lets the end of the spring move linearly as it is wound.

It is characteristic of the present invention a retractable tonneau cover for truck bed vehicles and similar that provides an axle drive equipped with supports that receive the clutch system at one end of the shaft and the motor equipped with coupling shaft and connection tube at the opposite end.

It is characteristic of the present invention a retractable tonneau cover for truck bed vehicles and similar that provides a clutch system that is equipped with a handle that, when threaded by the user, moves and enters the mechanism box by abutting and pushing the end of a fork in order to decouple the motor shaft.

It is characteristic of the present invention a retractable tonneau cover for truck bed vehicles and similar that provides a shaft that is provided with a motor arranged with the support that is provided with a connected and locked shaft with the coupling shaft provided with protrusions that fit the gear groves together.

It is characteristic of the present invention a retractable tonneau cover for truck bed vehicles and similar that provides a mechanism box provided in its outer portion by drains with the water outlet hoses, clutch decoupling handle and module, so that these components are positioned inside the bed.

It is characteristic of the present invention a retractable tonneau cover for truck bed vehicles and similar that provides a box that is equipped with a mat of interconnected profiles moving in a sliding manner along the side profiles fixed to the sides of the bed, the upper portion of the mechanism box having a finishing lid fixed by screws along the side profiles, allowing access to the internal components of the box.

It is characteristic of the present invention a retractable tonneau cover for truck bed vehicles and similar that provides profiles equipped with rails that are fitted with a box relief and are fixed to the mechanism box through a set of screws arranged on the side portion of the box.

BRIEF DESCRIPTION OF THE FIGURES

FIGS. 11A to 11G show a detailed view of the stress shaft, describing the embodiment of its inner components.

FIGS. 13 and 13A show the details of the drive axle, positioned with the mechanism box.

DESCRIPTION OF THE INVENTION

Figure 1:
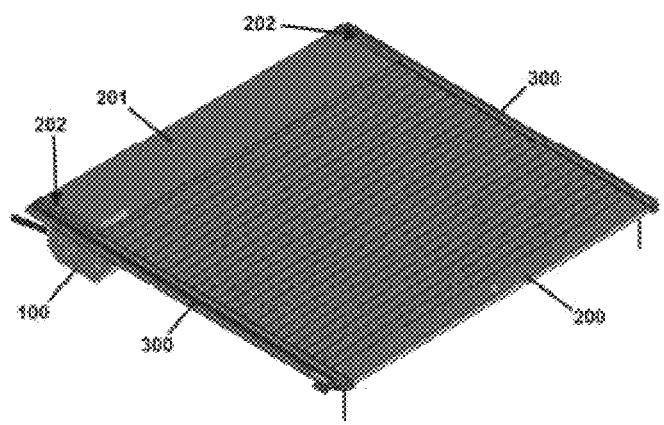
FIG. 1 shows a perspective view of the closed retractable tonneau cover.
Figure 2:
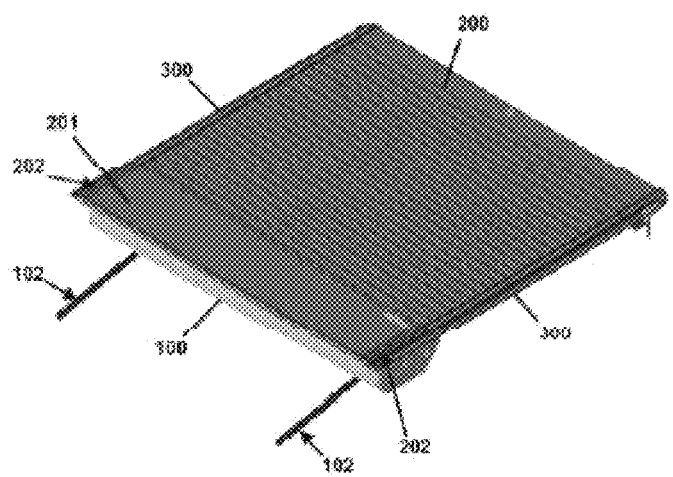
FIG. 2 shows the front perspective view of the closed retractable tonneau cover.

The retractable tonneau cover for truck bed vehicles and similar, object of the present invention, comprises a mechanism box (100), arranged in the front portion of the bed, equipped with a mat (200) of interconnected profiles moving in a sliding manner along the profiles sides (300) fixed along the sides of the bed, and in the upper portion of the mechanism box (100) is arranged a finishing lid (201) fixed with screws (202) with the side profiles (300) allowing easy access to the internal components of the box (100), as described in FIGS. 1 and 2.

Figure 3:
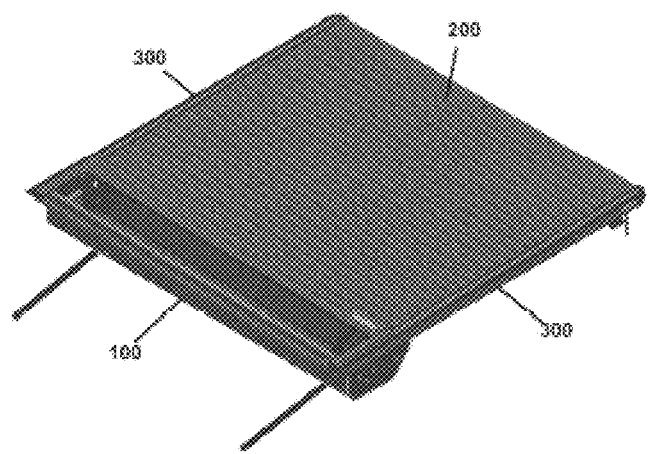
FIG. 3 shows the front perspective view of the closed retractable tonneau cover, demonstrating the mechanism box without the lid.

FIG. 3 shows the front perspective view of the tonneau cover, detailing the mechanism box (100), mat (200) and side profiles (300), without the finishing lid (201), detailing how the user can access the internal components.

Figure 4:
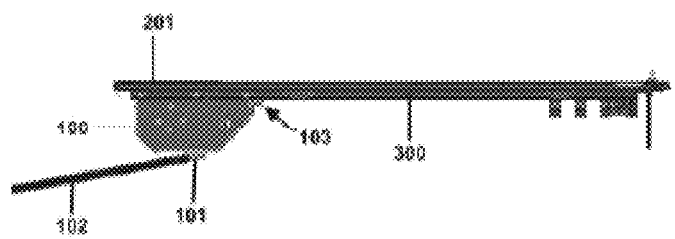
FIG. 4 shows the side view of the closed retractable tonneau cover.

FIG. 4 shows the side view of the tonneau cover showing the arrangement of the mechanism box (100) provided by drains (101) with water outlet hoses (102) and with the side profiles (300) and with the finishing lid (201).

Figure 5:
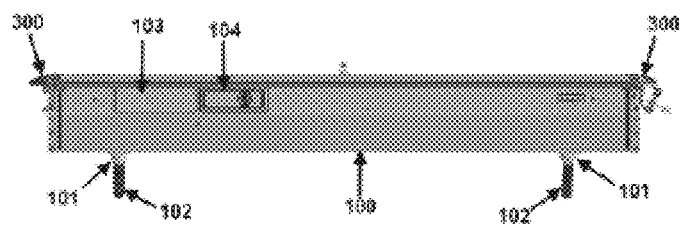
FIG. 5 shows the rear view of the closed retractable tonneau cover, detailing the positioning of the mechanism box in relation to the profiles and mat.

FIG. 5 shows the rear view of the tonneau cover showing the positioning of the mechanism box (100) on the front portion in order to allow the identification of the drains (101) with the water outlet hoses (102), clutch decoupling handle (103) and module (104) arranged in the outer portion of the box, so that these components are positioned inside the bed in order to allow easy access by the user when necessary.

Figure 6:
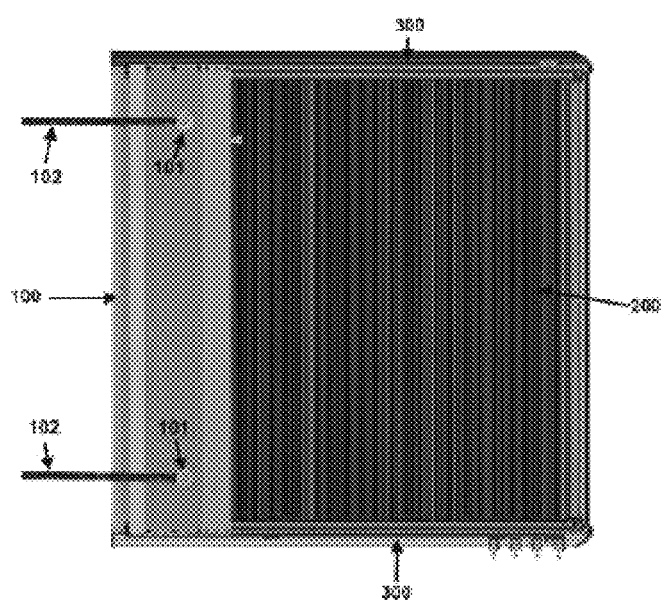
FIG. 6 shows the bottom view of the closed retractable tonneau cover, detailing the placement of the drains.
Figure 7:
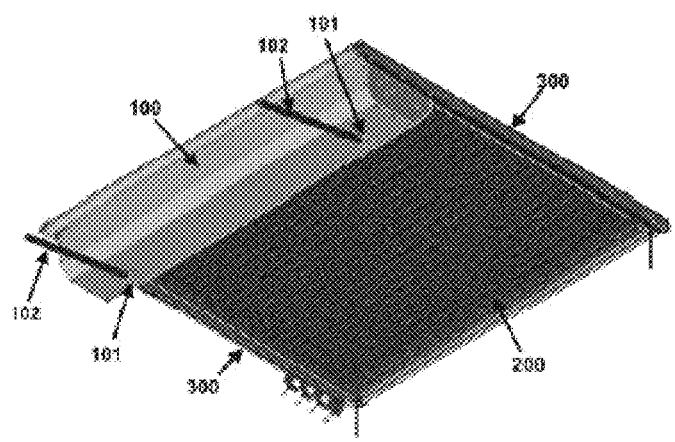
FIG. 7 shows the bottom perspective view of the closed retractable tonneau cover, detailing the placement of the drains.
Figure 7A:
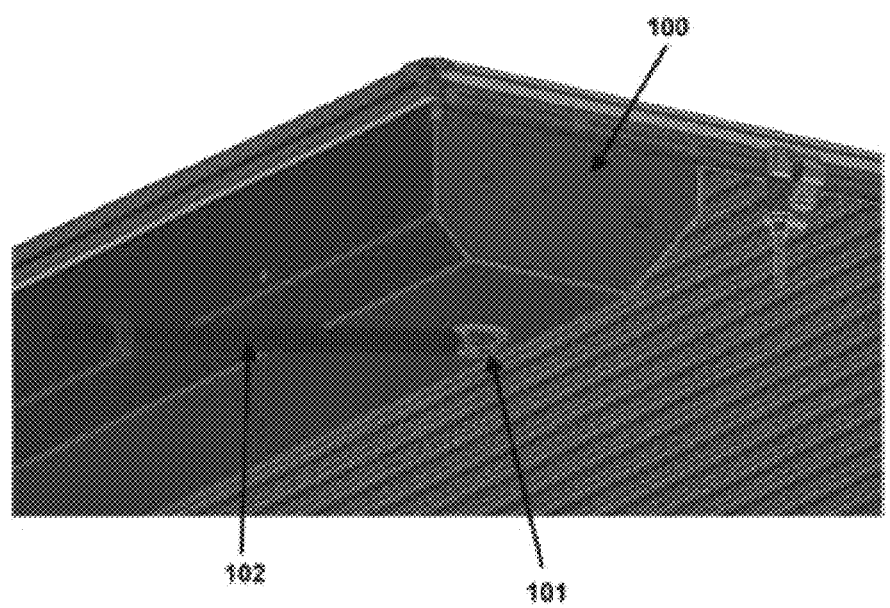
FIGS. 7A, 7B, 7C and 7D show the detailed view of the drain system and hose of the mechanism box.
Figure 7B:
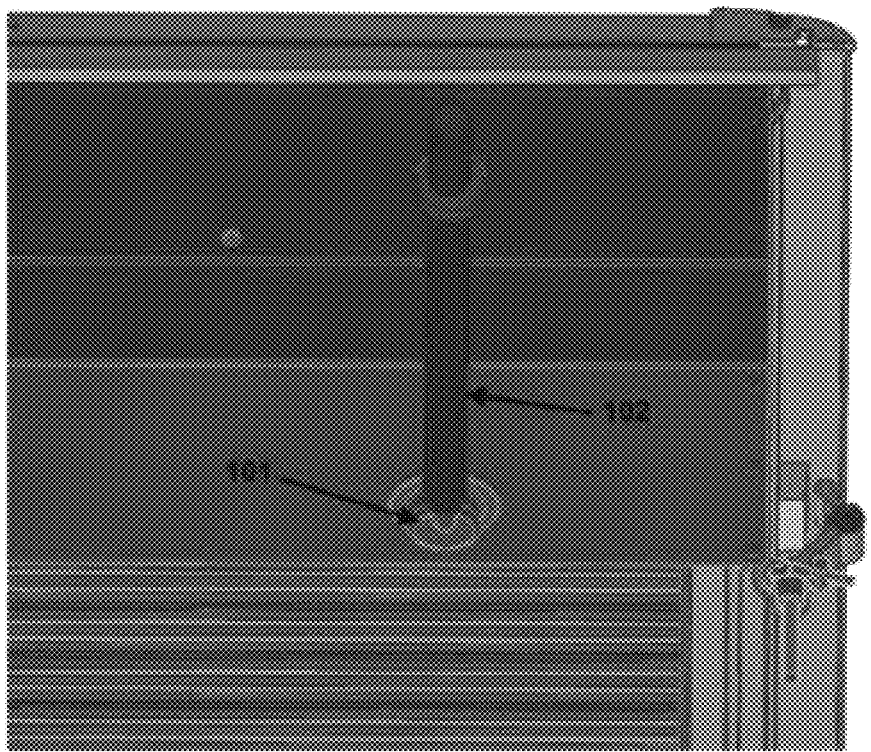
Figure 7C:
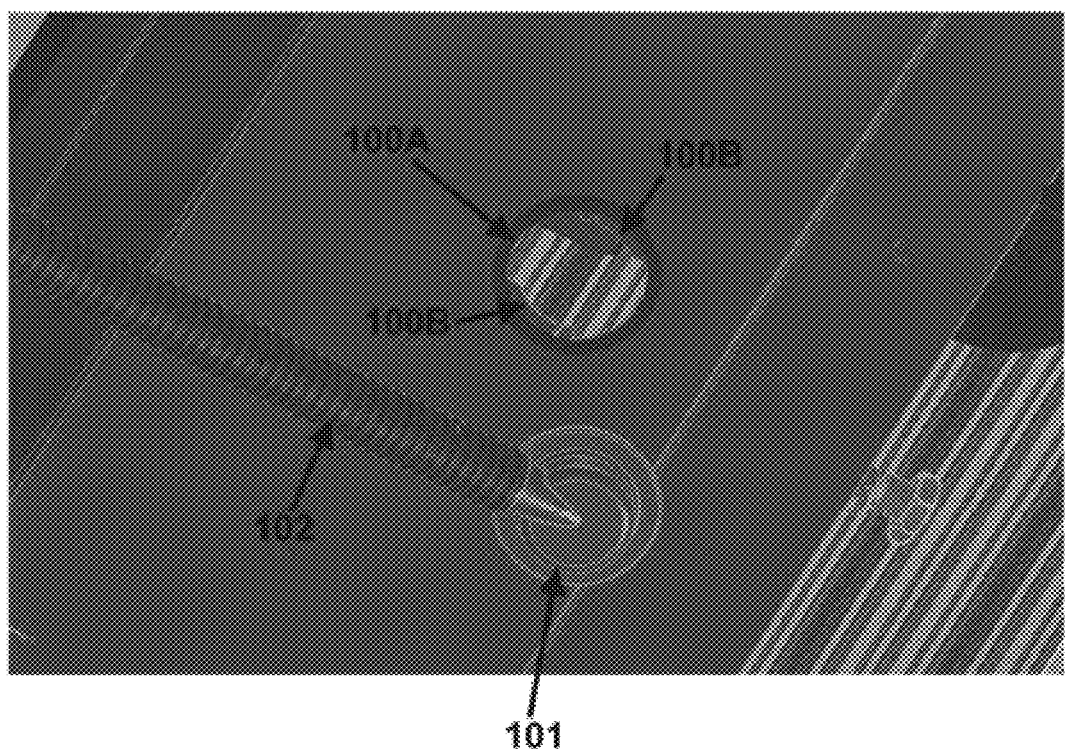
Figure 7D:
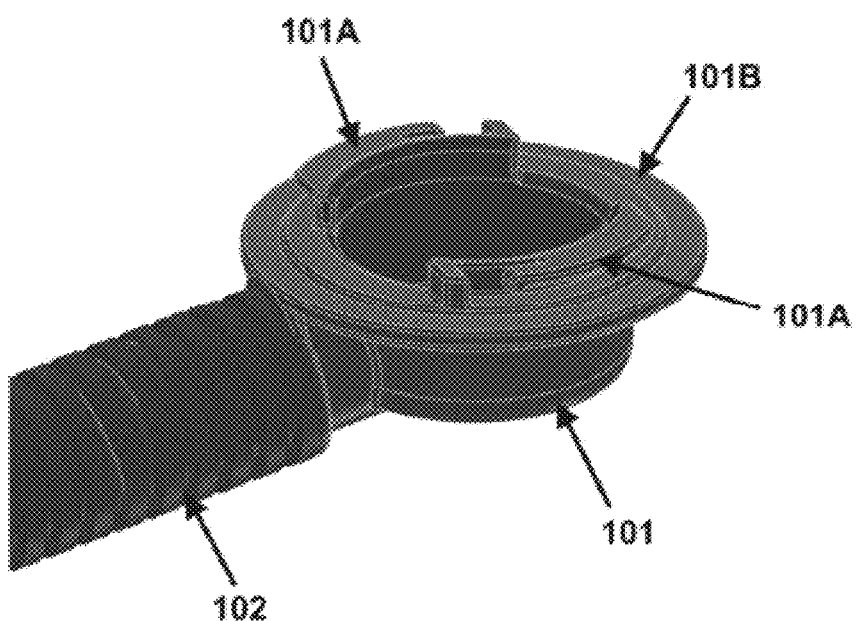

FIGS. 6 and 7 show the bottom view of the tonneau cover in order to detail the arrangement of the mechanism box (100) with the drains (101) and the water outlet hoses (102), the mat (200) and the profiles sides (300).

FIGS. 7A, 7B, 7C and 7D show the injected drains (101) that are fitted in the mechanism box (100) through an hole (100A) of specific geometry equipped with protrusions (100B) and a drain (101) having a fitting pin (101A) that allow the set to be fixed. The drain (101) is fixed to the hole (100A) by turning the injected drain (101) 90 degrees until the fitting pin (101A) finds its retaining position (100B) of the mechanism box (100) hole. In addition, the drain (101) is provided with a sealing ring (101B) that serves to seal the coupling between the parts, being arranged between the injected drain (10) and the mechanism box (100) and is pressed between these surfaces when locking occurs by rotating the injected drain (101). This mechanism allows easy installation and maintenance, allowing cleaning whenever the drains are blocked or periodically in a preventive manner.

Figure 8:
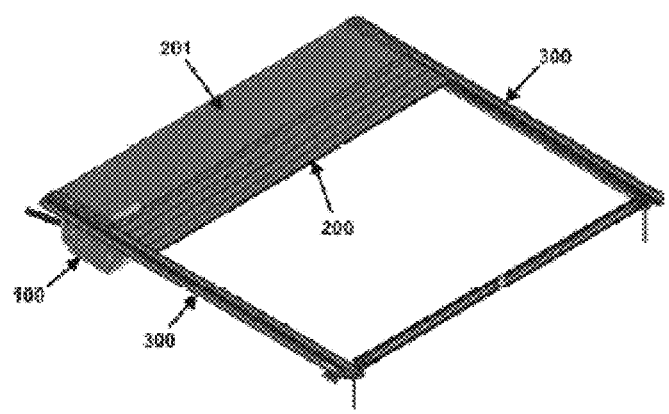
FIG. 8 shows a perspective view of the retractable tonneau cover with the mat rolled up to the box, showing the activation and movement of the mat along the side profiles.

FIG. 8 shows the perspective view of the tonneau cover with the mat (200) being rolled up with the mechanism box (100), showing the mat (200) moves in a sliding manner along the side profiles (300).

Figure 9:
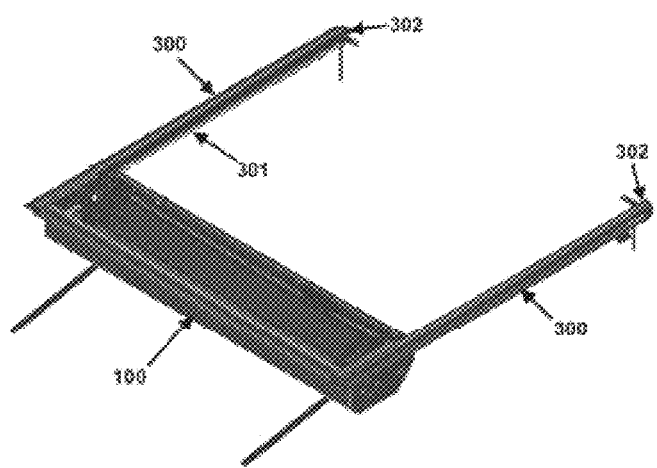
FIG. 9 shows the front perspective view of the box of mechanisms and profiles.

FIG. 9 shows the perspective view of the mechanism box (100) arranged only with the side profiles (300), so that FIGS. 9A, 9B, 9C and 9D show that the profiles (300) provided with rails (301) are fitted with a relief (103) of the box (100) and are fixed to the mechanism box (100) through a set of screws (104) arranged on the side of the box.

Figure 9A:
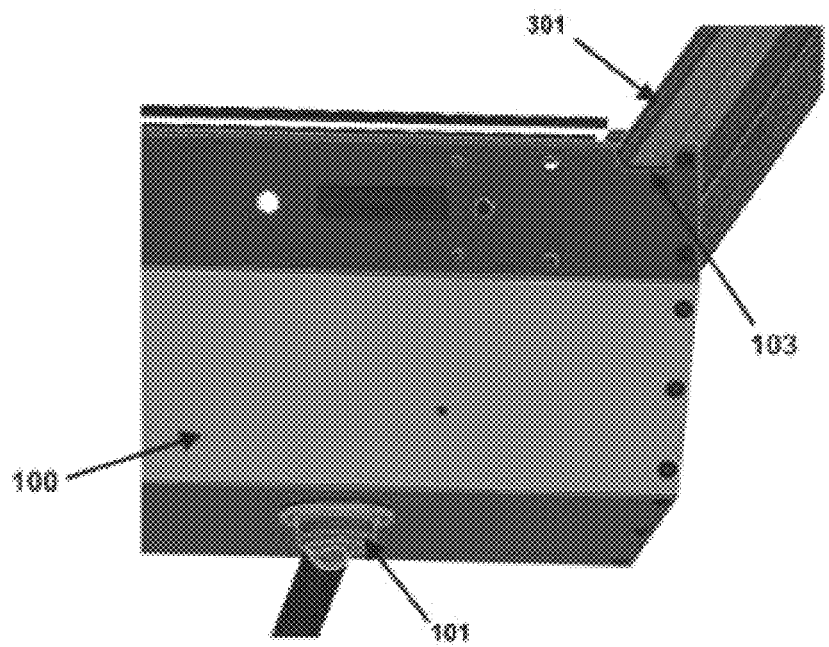
FIGS. 9A and 9B show the detailing of the box with relief for fixing the side profile with rail.
Figure 9B:
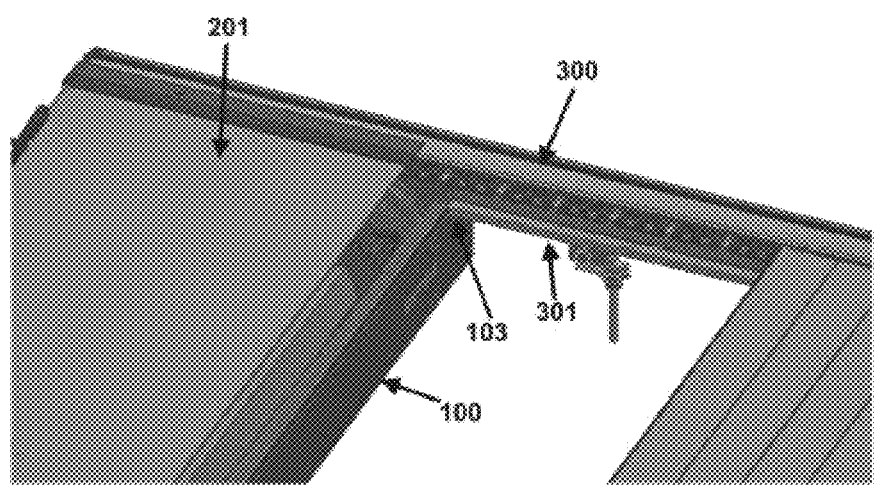

FIGS. 9A and 9B show details of the water collection rails (301) located on the side profiles (300) that capture any water infiltration from the mat (200) and direct it to the mechanism box (100) through the inlet (103) of the mechanism box (100) or to the tips of the side profile (302) located at the ends of the profiles (300).

Figure 9C:
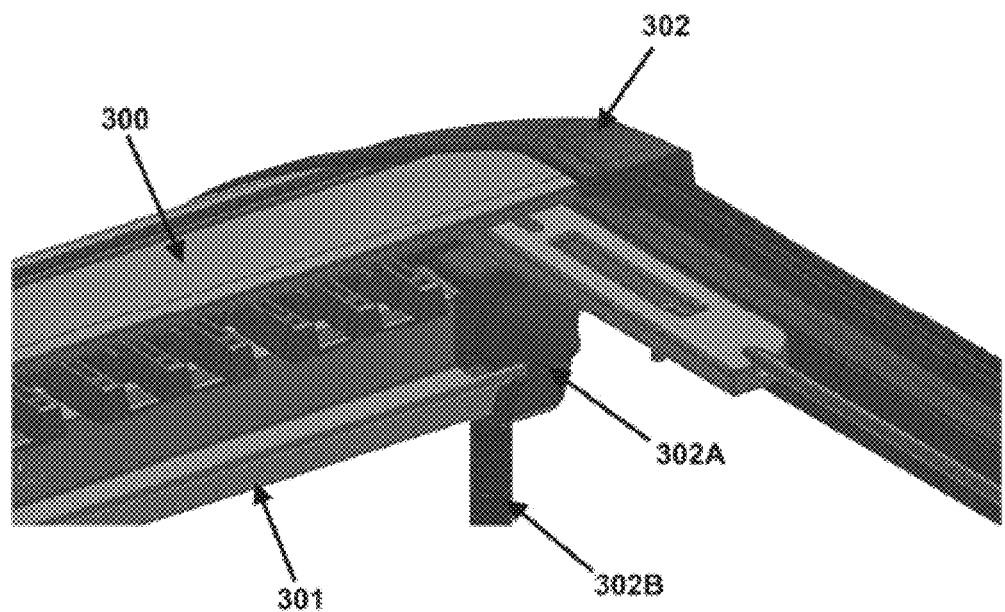
FIG. 9C shows the detailing of the rail profile at the other end and the FIG. 9D shows the detailing of the system for fixing the side profile to the box.

FIG. 9C shows the detail of the tip (302) of the profiles (300) equipped with built-in drains (302A) that carry the water captured by the rails (301) to the outside of the bed through the hoses (302B) connected to the tips (302) through threading.

Figure 9D:
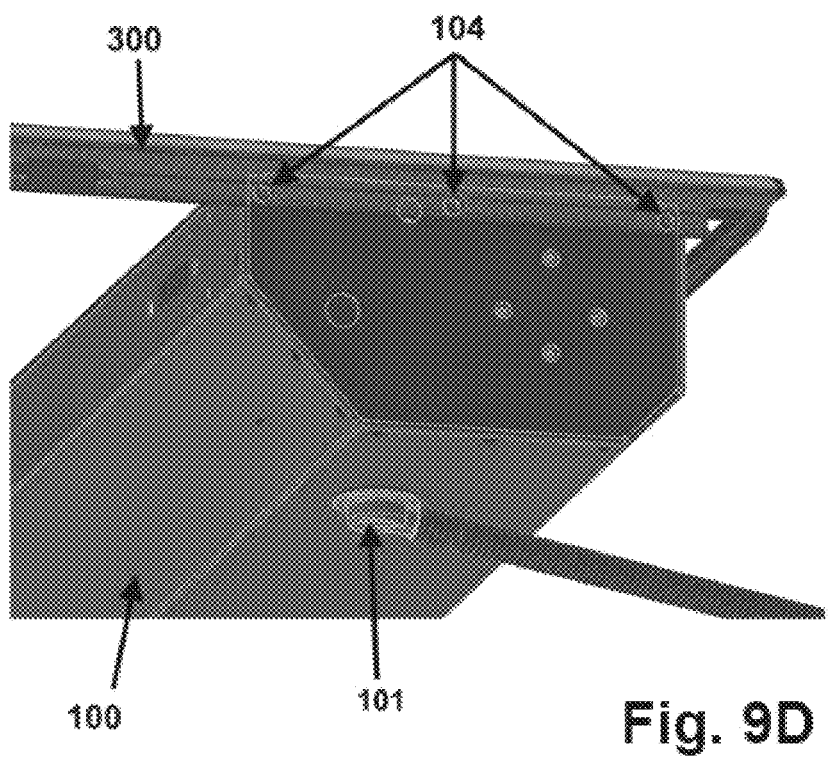

FIG. 9D shows the detail of fixing the mechanism box (100) through a set of screws (104) arranged along the sides.

Figure 10:
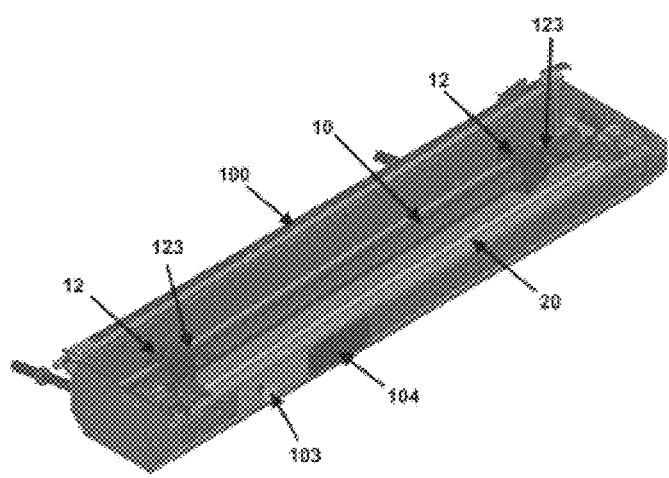
FIG. 10 shows the perspective view of the mechanism box, detailing its components.
Figure 11:
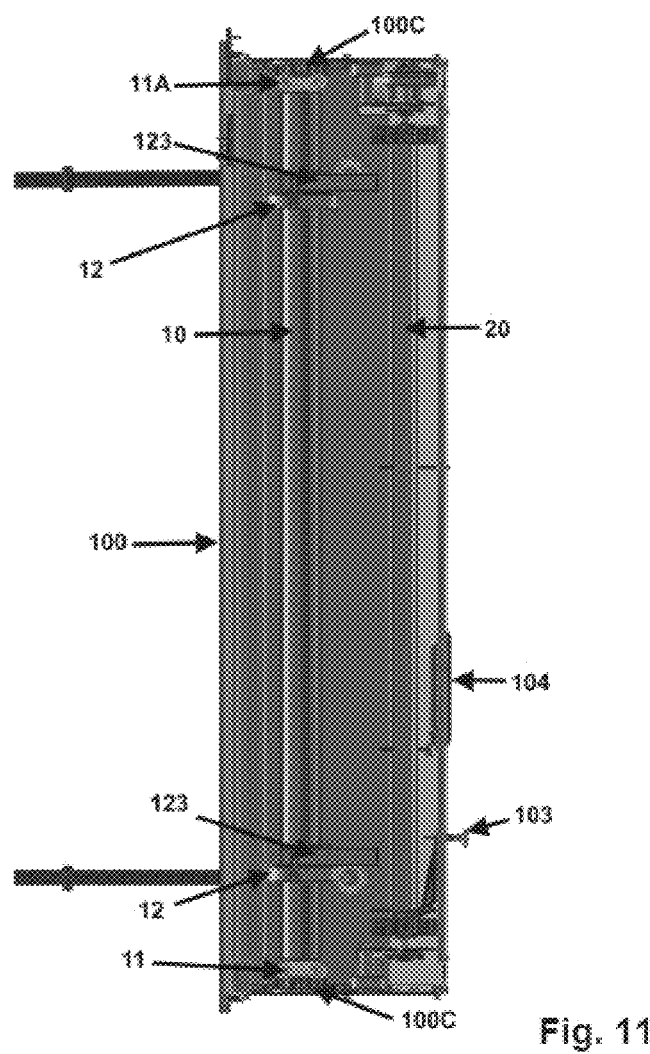
FIG. 11 shows the top view of the mechanism box, detailing its components.
Figure 12:
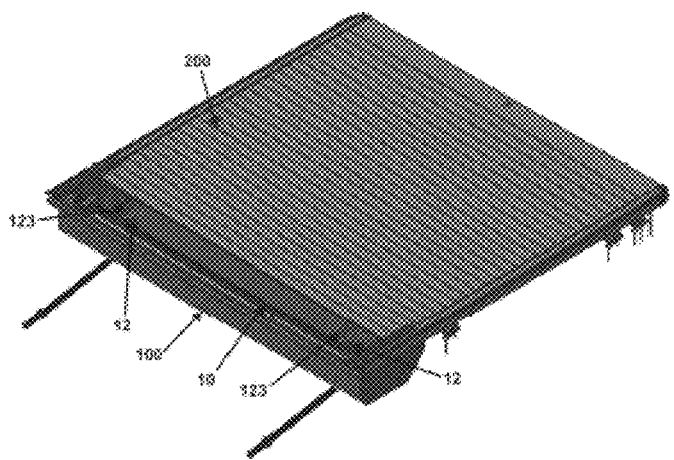
FIG. 12 shows the rear perspective view of the mechanism box, detailing the positioning of the roller straps fixing along the mat.
Figure 12A:
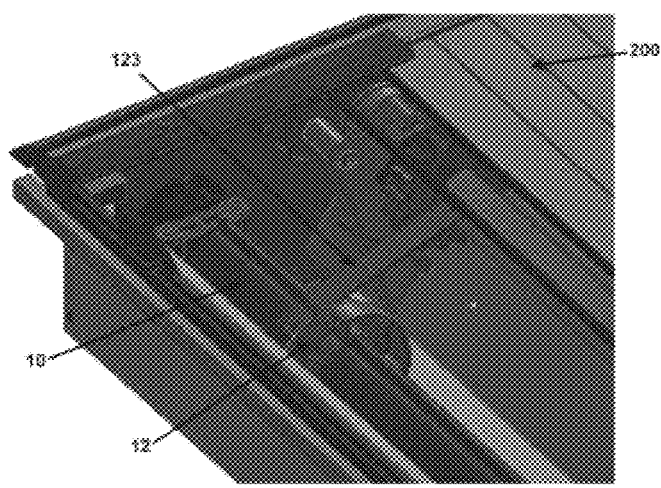
FIGS. 12A to 12C show the detailed view of the straps and rollers.
Figure 12B:
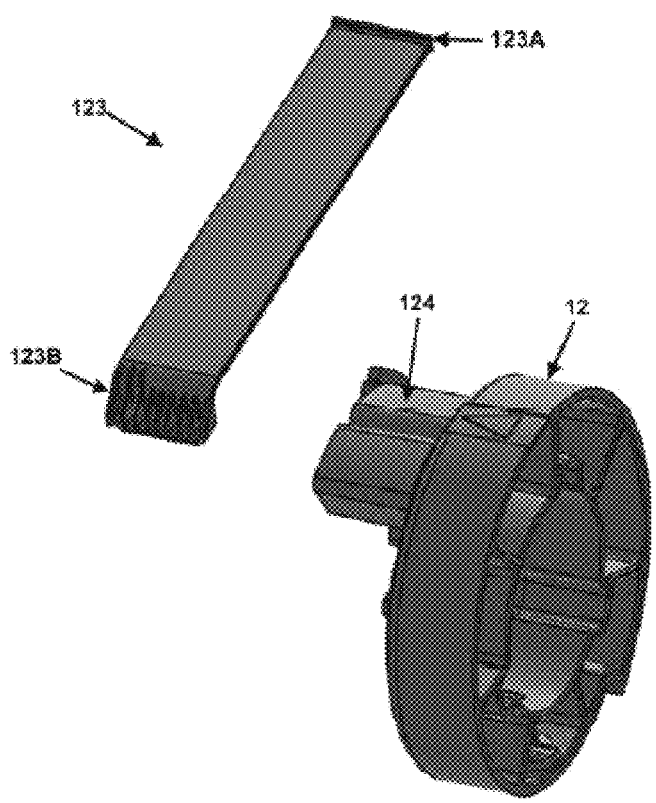
Figure 12C:
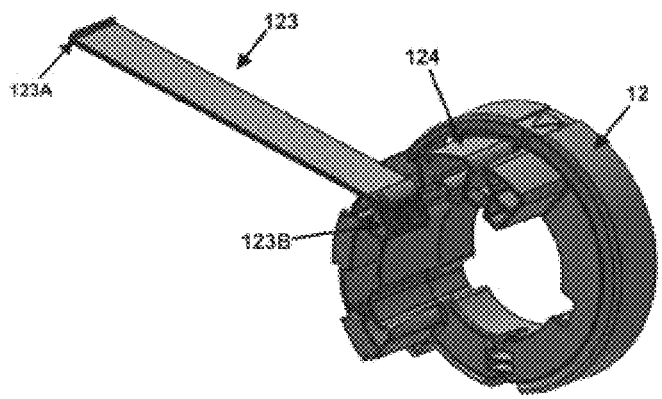
Figure 12D:
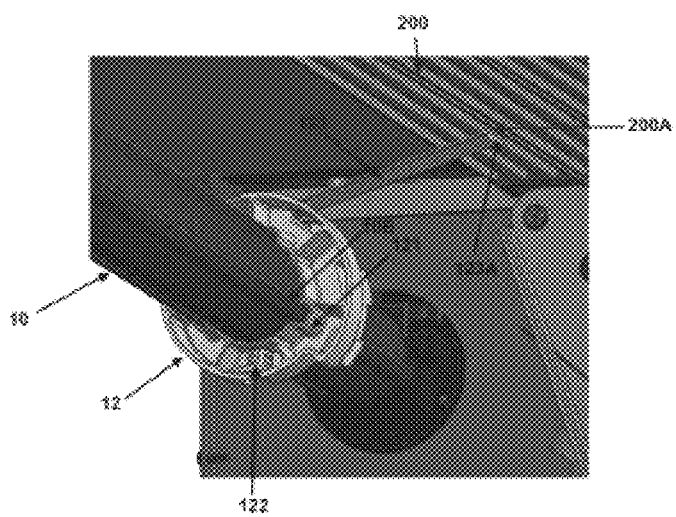
FIGS. 12D and 12E show the detailing of the roller attached to the shaft provided with a strap, detailing the way it is attached to the mat.
Figure 12E:
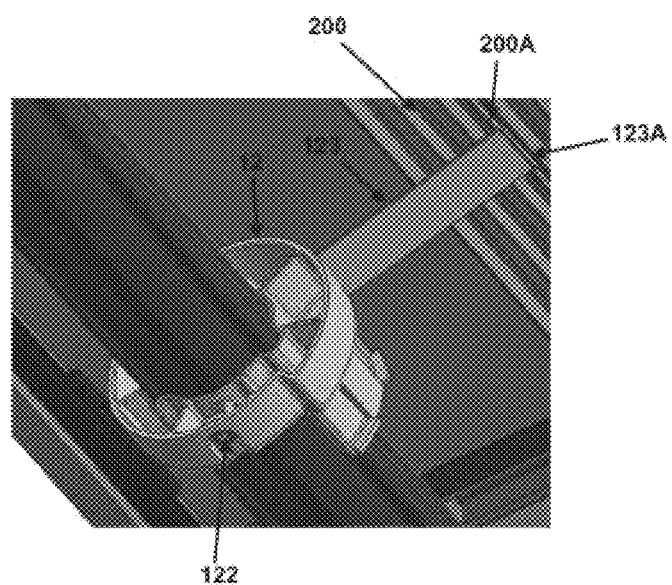

The set of FIGS. 10, 11 and 12 show the perspective view of the mechanism box (100) detailing the arrangement of the clutch drive handle (103) and electronic module (104) of the system. In the inner portion, the box (100) describes the arrangement of the stress shaft (10), drive axle (20) and clutch system (22).

The mechanism box (100) has in its inner portion the supports (100C) arranged on both sides, said supports (100C) allowing the fixing of the stress shaft (10) through the tips (11) and (11A).

Figure 10A:
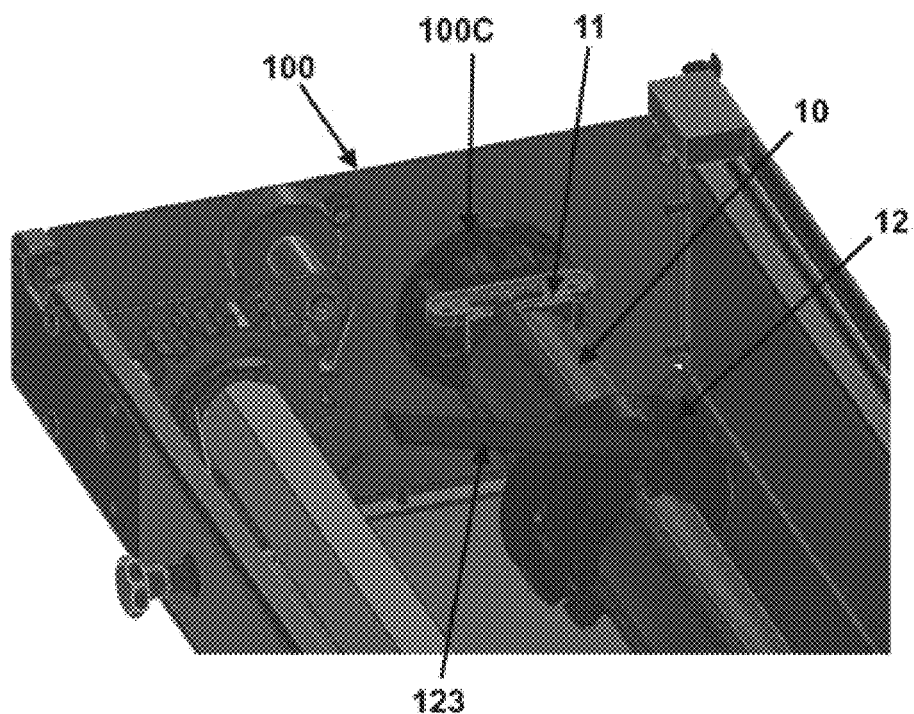
FIGS. 10A and 10B show a detailed view of the stress shaft fixing system with the support from the box.

FIG. 10A shows the detail of the positioning of the stress shaft (10) provided by the tip (11) arranged with the support (100C) of the box (100).

Figure 10B:
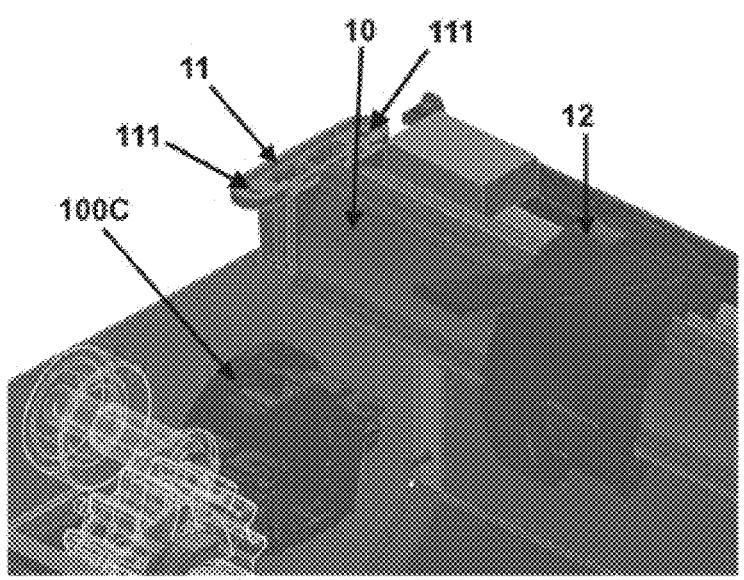
Figure 10C:
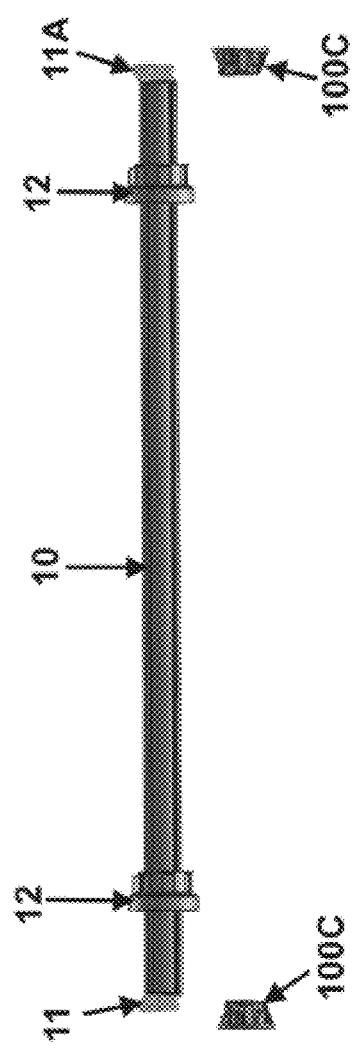
FIG. 10C shows the side view of the stress shaft to be fitted together with the support from the box.

FIGS. 10B and 10C shows the fixing detail between the support (100C) of the box (100) and the tips (11) and (11A) of the shaft (10), so that the assembly and fixation of the shaft (10) takes place by the upper portion due to the interlocking system between the structures and subsequent screwing through the holes (111) that connect the stress set (10) to the tip (100C), facilitating assembly and maintenance of the set.

Figure 11A:
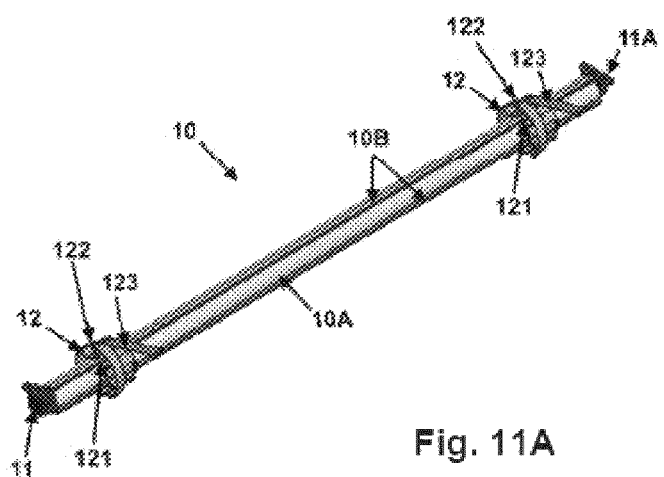
Figure 11B:
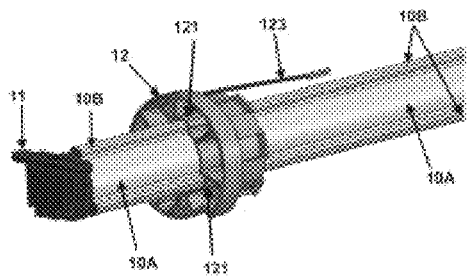
Figure 11D:
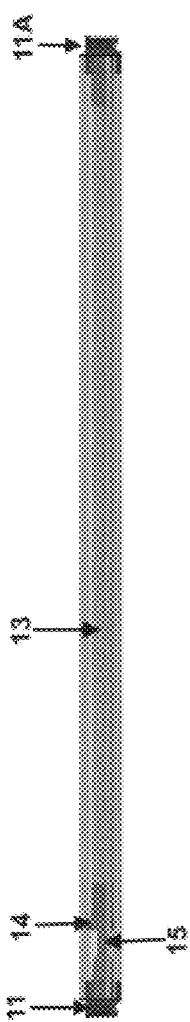
Figure 11E:
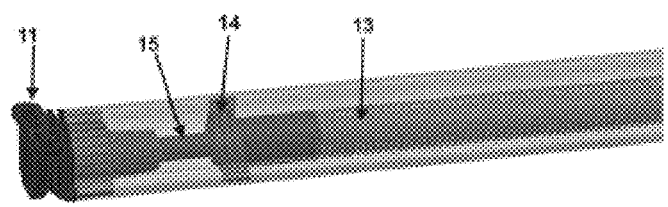
Figure 11F:
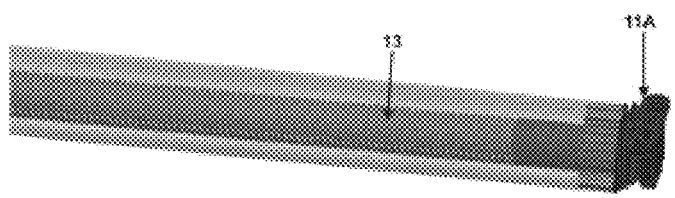

The stress shaft (10) consists of a profile (10A) provided with its own cylindrical geometry with protrusions (10B) arranged longitudinally in order to allow the fixation of rollers (12) through the grooves (121) that fit together with the 3 protrusions (10B) of the shaft (10), and the fixation of the rollers (12) with the shaft (10) occurs through a screw (122). The shaft (10) has tips (11) and (11A) at its ends, as shown in FIGS. 11A and 11B.

Figure 11G:
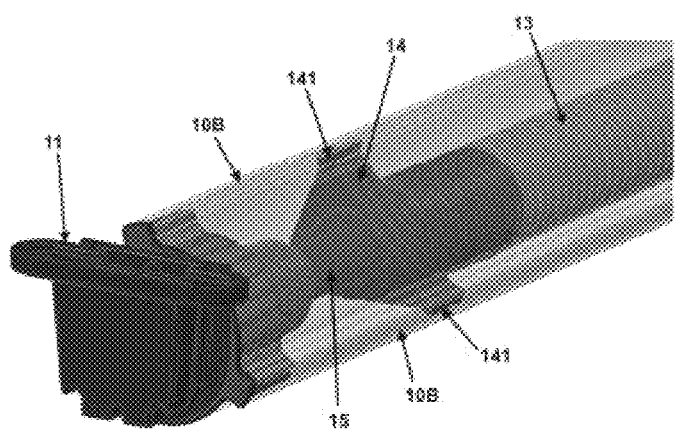

Inside the profile (10A) of the stress shaft (10), a helical spring (13) is positioned threadedly with the tip (11A) keeping the spring anchored to the side of the box and locking its rotational movement and at the other end the spring (13) it is threaded to another piece called the torpedo (14) responsible for rotationally fixing in relation to the profile (10A) of the stress shaft (10). Across the entire set there is still a cylindrical rod (15) responsible for supporting the spring (13) inside the profile (10A) of the stress shaft (10), said rod (15) fitting at its ends to the tips (11) and (11A) of the stress shaft (10) and is covered by a cover (not shown) that prevents the spring (13) from contacting the shaft, preventing noise and wear of the system. This system allows rotational force to build up as we rotate drive axle (10) relative to mechanism box (100), as detailed in FIGS. 11C, 11D, 11E and 11F. The torpedo (14) is provided with projections (141) that allow the attachment to the protrusions (10B) of the drive axle (10) profile, in order to allow the rotational locking of the spring (13) but still letting the end of the spring move linearly as it is being rolled, as detailed in FIG. 11G.

The mat (200) has a pair of plastic straps (123) that have fitting details (123A) and (123B). The strap (123) is connected to the mat (200) connecting the end (123A) with the mat fitting so that the fastening occurs through the end (123A) along the groove (200A) of the mat (200). The connection of the mat (200) to the stress shaft (10) is given through the fitting of the strap (123) base (123B) to the rollers (12) projection (124) providing the rotational force promoted by the accumulation of energy in the spring (13) is transferred to the mat (200) enabling the mat to be collected inside the mechanism box (100) and keeping the mat tightly wound to the stress shaft (10) ensuring the smallest possible winding diameter of the mat (200), as detailed in FIGS. 12, 12A, 12B and 12C.

Figure 13:
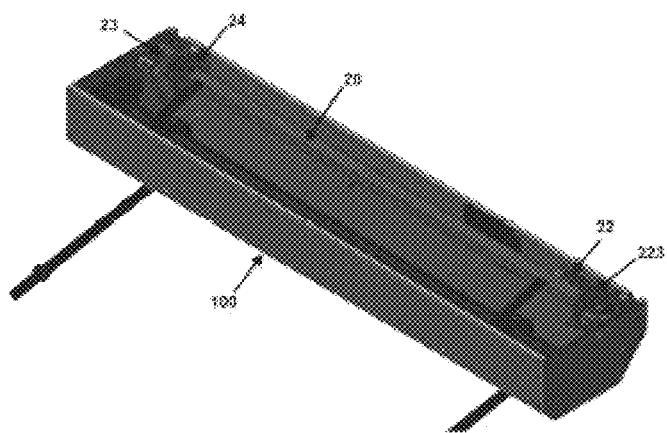
Figure 13B:
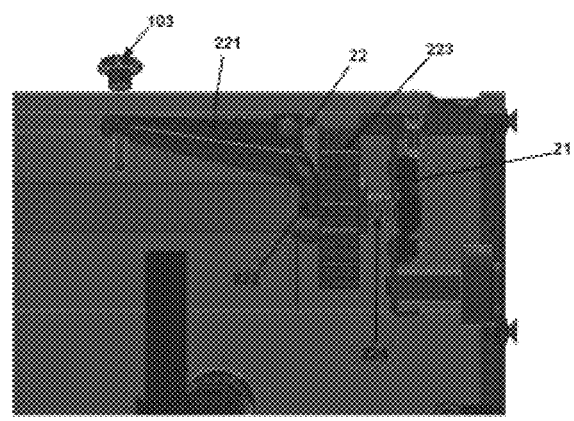
FIGS. 13B and 13C show the details of the clutch system applied to the drive axle.
Figure 13C:
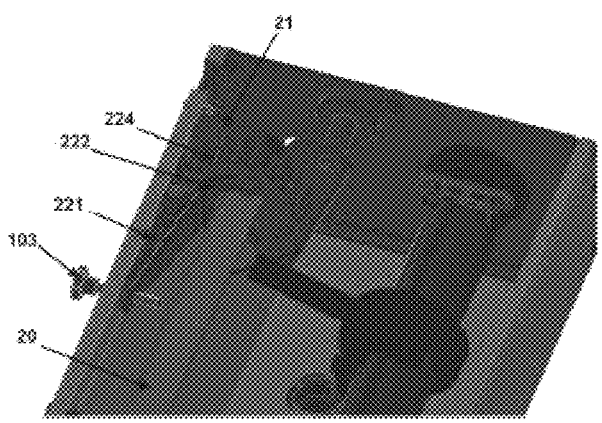
Figure 13D:
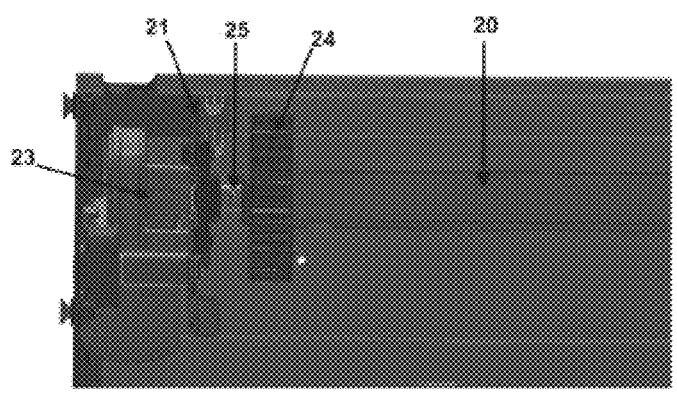
FIGS. 13D and 13E show the details of the motor fixing system with the drive axle.
Figure 13E:
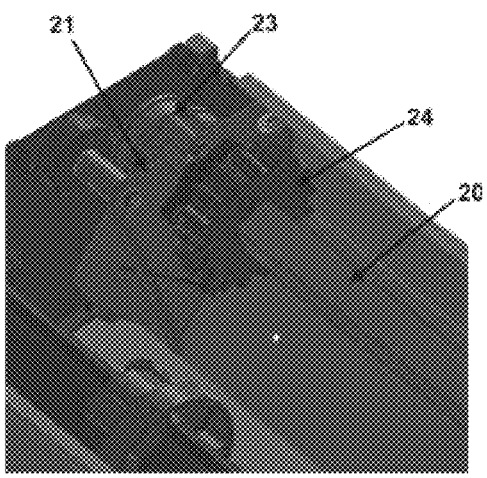
Figure 13F:
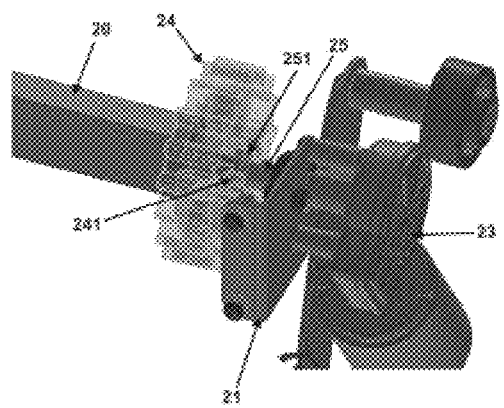
FIGS. 13F and 13G show the details of the fixing and displacement system of the gear with the motor.
Figure 13G:
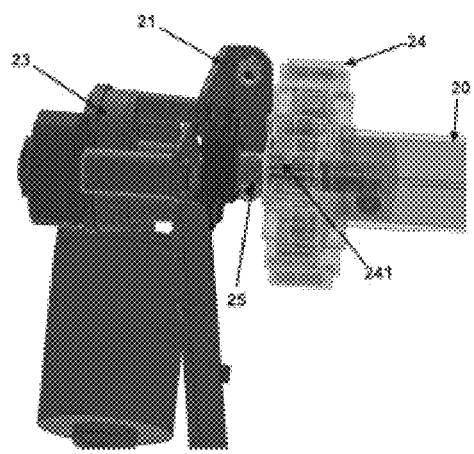
Figure 13H:
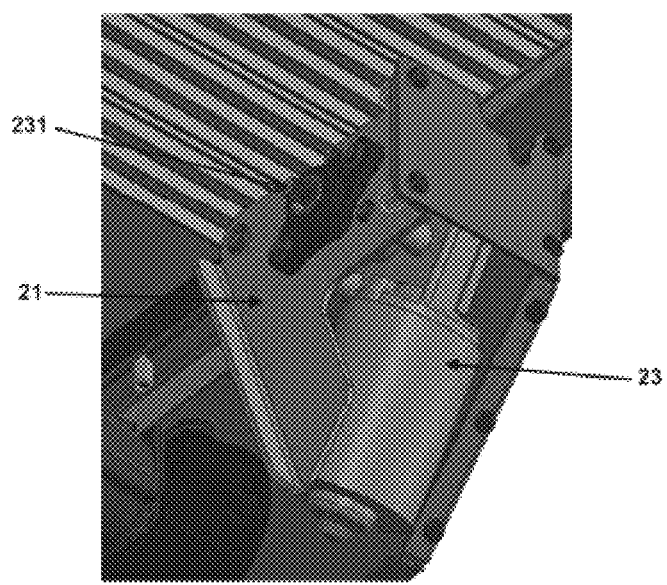
FIG. 13H shows the perspective view of the engine arranged with the support, detailing the motor shaft.

In the set of FIG. 13 the arrangement of the drive axle (20) is detailed, provided with supports (21) that receive the clutch system (22) at one of the shaft ends and the motor (23) with coupling shaft and connecting tube at the opposite end.

The clutch system (22) serves to use the tonneau cover in the event of an electrical malfunction that prevents the mat (200) from moving automatically. The system is provided with a handle (103) which, when threaded by the user, moves more and more into the mechanism box (100) abutting and pushing the end of a fork (221) provided with a support (222) that is fitted with a clutch (223) fixed to the main shaft, laterally shifting the drive axle (10) and increasingly compressing the spring (224) in order to decouple the motor shaft (23), as described in FIGS. 13, 13A, 13B and 13C.

The opposite end of the shaft (20) is provided with a clutch (24) that directs the traction of the motor (23) for moving the mat (200), and the clutch (24) is fixed to the shaft (20).

The motor (23) arranged to the support (21) is provided with a shaft (231) that is connected and locked with the coupling shaft (25) provided by protrusions (251) fitting with the grooves (241) of the clutch (24), so that when the clutch system (22) is activated the clutch (24) is moved with shaft (20) in order to decouple the grooves (241) of the protrusions (251) from the coupling shaft (25) of the motor (23), thus allowing manual movement of the mat (200).

Figure 14:
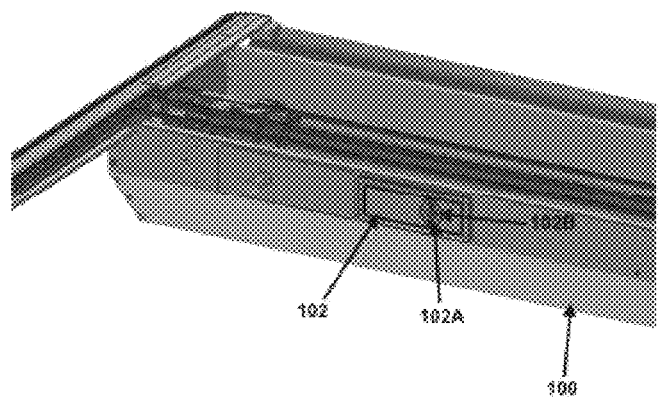
FIG. 14 shows the perspective view of the mechanism box, detailing the module positioning and its embodiment equipped with buttons.

In FIG. 14, the electronic module (102) arrangement for managing the equipment with the box (100) is detailed, and this embodiment arrangement facilitates the fitting and removal of the component for maintenance and repairs without the need to disassemble the entire set, as access occurs through the inside of the bed.

Figure 14A:
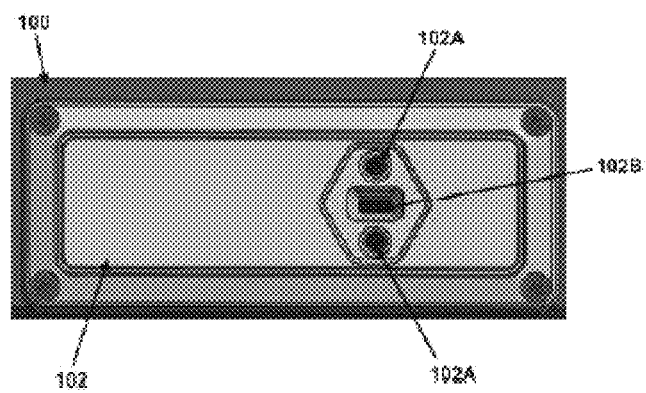
FIG. 14A shows the front view of the module arranged with the mechanism box and detailing the activation buttons and lighting points.

The module (102) is completely sealed which allows a perfect water and dust seal, ensuring greater durability of the component even in extreme situations. In addition, the module (102) is equipped with a set of buttons (102A) that allow manual activation of the settings and the opening and closing system. The module is equipped with a lighting point (102B) that is activated when the user opens the tonneau cover or by the remote-control button, illuminating the inside of the bed, as detailed in FIG. 14A.

The module (102) is equipped with embedded software that allows management via Bluetooth through an application on a smartphone or other electronic device, allowing the user to remotely control the opening, closing and settings of the system.

The invention claimed is:

1. A retractable cover for truck bed vehicles, which comprises a mechanism box (100) provided in the inner portion with a stress shaft (10) consisting of a profile (10A) provided with a cylindrical geometry with at least three protrusions (10B) arranged longitudinally in order to allow fixing of at least two rollers (12) through a groove (121) that fit together with the at least three protrusions (10B) of the stress shaft (10), and fixing of the at least two rollers (12) with the stress shaft (10) occurs through a screw (122) and at its ends the stress shaft (10) has a first tip (11) and a second tip (11A) that fit together with at least two supports (100C) of the mechanism box (100), the profile (10A) having in its inner portion a helical spring (13) threadedly attached to the second tip (11A) keeping the helical spring anchored to a side of the mechanism box and locking its rotational movement and at the other end it is threaded to a torpedo (14) responsible for rotationally securing the helical spring (13) in relation to the profile (10A) of the stress shaft (10), this assembly being provided with a cylindrical rod (15) responsible for supporting the helical spring (13) within the profile (10A) of the stress shaft (10), the cylindrical rod (15) fitting at its ends the first tip (11) and the second tip (11A) of the stress shaft (10), the torpedo (14) provided with at least two projections (141) allowing the attachment to the protrusions (10B) of the profile of the stress shaft (10), in order to allow rotational locking of the helical spring (13) but still let the spring end move linearly as it is being wound; a drive shaft (20) provided with at least two supports (21) that receive at one end of the shaft a clutch system (22) and at the opposite end a motor (23) provided with coupling shaft and connecting tube, the clutch system (22) which is provided with a relief (103) which, when threaded by the user, moves and enters the mechanism box (100) abutting and pushing the end of a fork (221) provided with a support (222) that is fitted with a gear (223) fixed to the main shaft, laterally shifting the stress shaft (10), compressing a spring (224) more and more in order to decouple the motor (23), at the end opposite the drive shaft (20) is provided with a gear (24) that directs traction of the motor (23) for movement of a mat (200), and the gear (24) is fixed to the drive shaft (20), the drive shaft (20) which is provided with the motor (23) arranged with the at least two support (21) which is provided with a shaft (231) connected and locked with a coupling shaft (25) provided with at least two protrusions (251) that fit together with a groove (241) of the gear (24), so that when the clutch system (22) is actuated the gear (24) is moved together with the drive shaft (20) in order to decouple the groove (241) from the at least two protrusions (251) of the coupling shaft (25) of the motor (23) and the manual movement of the mat (200); the mechanism box (100) is provided on its outer portion with a drain (101) with a water outlet hose (102), clutch decoupling the relief (103) and a module (104), so that these components are positioned inside the truck bed vehicle, the mechanism box (100) which is provided with a mat (200) of interconnected profiles that moves in a sliding manner along a side profile (300) fixed to the sides of the truck bed vehicle, and in an upper portion of the box mechanism (100) a finishing lid (201) is arranged through at least two screws (202) with the side profile (300) allowing access to the internal components of the mechanism box (100), the side profile (300) which is provided with a rail (301) which is fitted together with the relief (103) of the mechanism box (100) and is fixed to the mechanism box (100) through a set of screws arranged on the side portion of the box.

2. The retractable cover for truck bed vehicles, according to claim 1, wherein the assembly and fixation of the stress shaft (10) are configured to through an upper portion due to a fitting system between structures and subsequent screwing at least two holes (111) connecting the set of the stress shaft (10) to the at least two support (100C).

3. The retractable cover for truck bed vehicles, according to claim 1, wherein the cylindrical rod (15) is configured to covered by a cover sufficient to preventing contact of the helical spring (13) with the shaft.

4. The retractable cover for truck bed vehicles, according to claim 1, wherein the clutch system (22) allows a manual use of the cover in the event of an unforeseen electrical event that prevents movement of the mat (200) automatically.

5. The retractable cover for truck bed vehicles, according to claim 1, wherein the drain (101) is fitted in the mechanism box (100) through an hole (100A) provided with at least two protrusions (100B), the drain (101) having a fitting pin (101A) allowing fixation of the set.

6. The retractable cover for truck bed vehicles, according to claim 5, wherein fixation of the drain (101) with the hole (100A) occurs by rotating the drain (101) 90 degrees until the fitting pin (101A) find its retaining position from an hole in the mechanism box (100).

7. The retractable cover for truck bed vehicles, according to claim 5, wherein the drain (101) is provided with a sealing ring (101B) configured to seal coupling between the parts, being arranged between the drain (101) and the mechanism box (100) and is pressed between these surfaces when locking occurs by the rotation of the drain (101).

8. The retractable cover for truck bed vehicles, according to claim 1, wherein the rail (301) is configured to capture any water infiltration from the mat (200) and direct captured water to the mechanism box (100) through the relief (103) of the mechanism box (100) or to at least two tips (302) of the side profile (300) located at the ends of the side profile (300).

9. The retractable cover for truck bed vehicles, according to claim 1, wherein the at least two tips (302) of the side profiles (300) are provided with a built-in drain (302A) configured to carry water captured by the rail (301) to outside the bed through a hose (302B) connected to the at least two tips (302) by threading.

10. The retractable cover for truck bed vehicles, according to claim 1, wherein the mat (200) has a pair of plastic straps (123) that have a fitting base (123A) and a fitting base (123B), the pair of plastic straps (123) which is connected to the mat (200) connecting an end of fitting detail (123A) with the mat fitting so that fastening takes place through the end of fitting detail (123A) along a groove (200A) of the mat (200).

11. The retractable cover for truck bed vehicles, according to claim 10, wherein the connection of the mat (200) to the stress shaft (10) is performed by fitting the fitting base (123B) of the pair of plastic straps (123) to a projection (124) of the at least two rollers (12) configured to provide rotational force promoted by accumulation of energy in the helical spring (13), which is transferred to the mat (200) enabling retraction of the mat to an interior of the mechanism box (100) and maintaining the mat wound to the stress shaft (10).

12. The retractable cover for truck bed vehicles, according to claim 1, wherein the mechanism box (100) is provided with an electronic module (102) provided with a set of buttons (102A) that allows manual activation of settings and opening and closing system and by a lighting point (102B) that is activated when a user opens the cover or by a button of the remote control.

13. The retractable cover for truck bed vehicles, according to claim 12, wherein the electronic module (102) is equipped with embedded software that allows management via BLUETOOTH through an application on a smartphone or other electronic device, allowing the user to control remotely the opening and closing system and settings.

* * * * *